United States Patent [19]
Holloway

[11] Patent Number: 4,865,295
[45] Date of Patent: Sep. 12, 1989

[54] HOLLOWAY'S SELF-DEPLOYING STABILIZING JACK

[76] Inventor: Lowell E. Holloway, #17 Brook Haven Dr., Mt. Vernon, Ill. 62864

[21] Appl. No.: 63,008

[22] Filed: Jun. 17, 1987

[51] Int. Cl.$^4$ ............................................. B66F 9/02
[52] U.S. Cl. ............................ 254/423; 340/52 R; 254/89 H
[58] Field of Search .................... 254/423, 420, 89 H; 280/6.1, 6.11, 6 H; 340/52 R, 686

[56] References Cited

U.S. PATENT DOCUMENTS

| | | | |
|---|---|---|---|
| 1,988,304 | 12/1934 | Duman | 254/86 |
| 2,002,428 | 5/1935 | Black | 254/423 |
| 2,194,594 | 3/1940 | Halley | 254/93 |
| 2,837,312 | 10/1954 | Troche | 254/423 |
| 2,882,070 | 4/1959 | Dill | 280/475 |
| 3,362,683 | 12/1967 | Hansen | 254/86 |
| 3,426,918 | 2/1969 | Keinonen | 212/145 |
| 3,454,251 | 7/1969 | Dye | 248/354 |
| 3,489,428 | 1/1970 | Hunter | 280/150.5 |
| 3,817,493 | 6/1974 | Hauser | 254/86 R |
| 3,825,279 | 7/1974 | Schmeichel | 280/150.5 |
| 3,860,216 | 1/1975 | Brown | 254/86 H |
| 3,975,723 | 8/1976 | Bowling | 340/686 |
| 4,235,542 | 11/1980 | Paterik | 254/86 H |
| 4,538,644 | 9/1985 | Knutson | 137/625.64 |

OTHER PUBLICATIONS

U.S. Patent 2,837,312 Troche 1958 Class 254 Sub 86.

*Primary Examiner*—James G. Smith
*Assistant Examiner*—David Holmes
*Attorney, Agent, or Firm*—Don W. Weber

[57] ABSTRACT

A self-deploying stabilizing support jack is presented which stabilizes and positions a recreational vehicle or trailer. The support jack comprises a bracket, a two-cylinder, lift arms and a stabilizing sleeve. The lift arms and cylinder are attached to the bracket at separate, offset first and second points so that when the ram of the cylinder contacts the foot of the lift arm, the entire apparatus is raised to a horizontal position. A stabilizing sleeve attached to the lift and surrounding the cylinder stabilizes the the device from lateral movement. An intermediate third pivot point in the lift arm helps reduce stress upon raising. Also provided is an automatically released pressure valve for the cylinder and a signalling device to warn the operator when the support jack is in the deployed position. A safety circuit also automatically raises any support jack that is not in the horizontal safety position should the ignition be turned to the "ON" position.

6 Claims, 3 Drawing Sheets

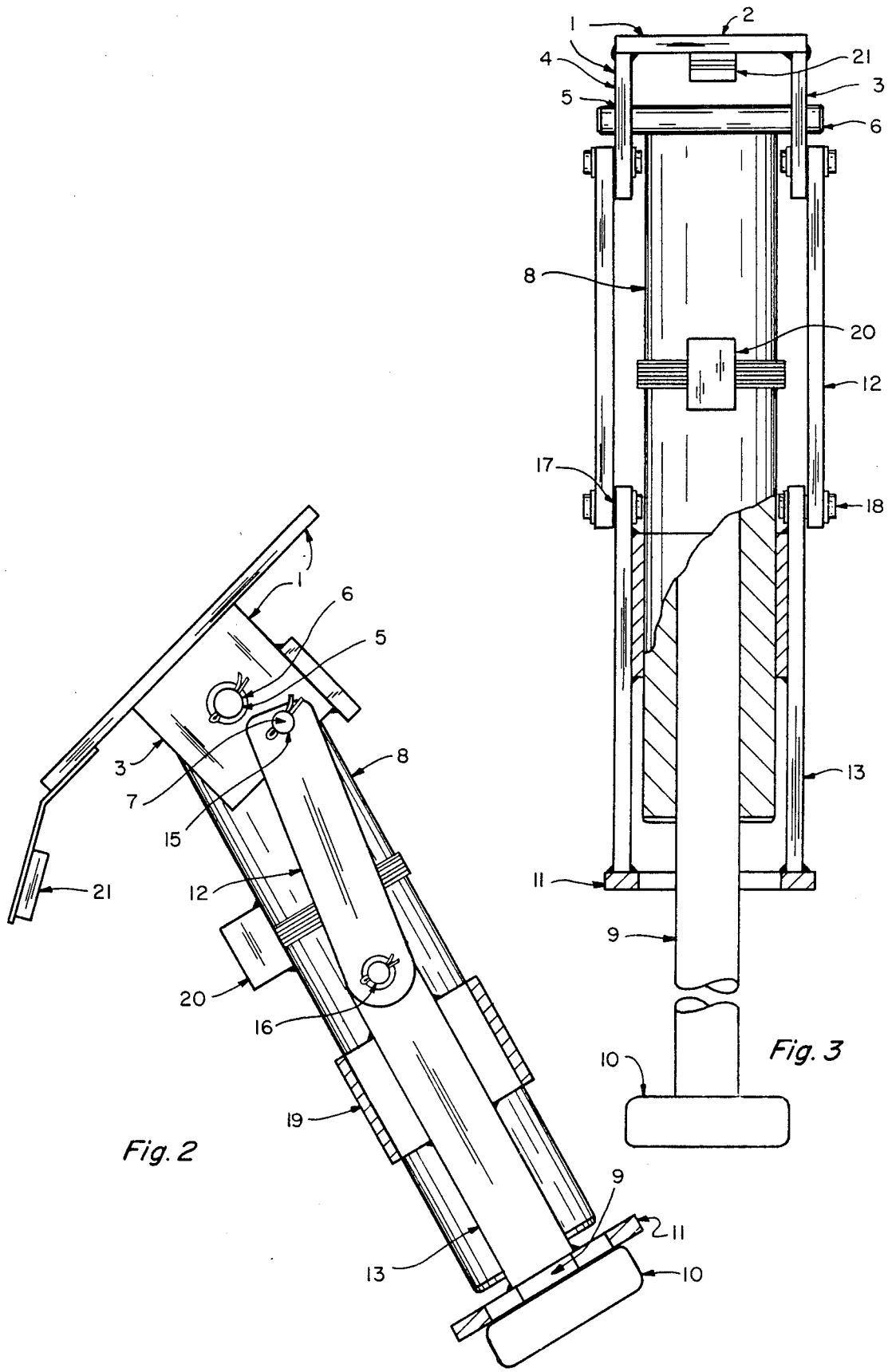

HOLLOWAY'S SELF-DEPLOYING STABILIZING JACK

BACKGROUND OF THE INVENTION

The instant invention relates to the field of vehicle jacks and particularly to the area of load-levelling supports for trailers or motor homes. With the recent advent of widespread use of recreational vehicles, a need has arisen to provide a level, non-wheel support for such units. While numerous devices have been advanced to support vehicles, all have involved highstress designs and cumbersome safety features. While the idea of using offset pivot points to raise a jack from the vertical position has heretofore been known in the art (see, for example, Hansen, U.S. Pat. No. 3,362,683), these types of support devices require a high-stress torque arm to accomplish the deployment and are unstable because they depend upon the hydraulic cylinder itself for stability in all directions. While other devices provide stabilizing devices in addition to the deployment apparatus, as in (Hauser, U.S. Pat. No. 3,817,493,) none of the current inventions solves the problem of a structure sufficiently stable yet placing little stress on the horizontal actuating member.

The present invention provides both a low-stress retracting mechanism and a simple stabilizing mechanism. By employing three pivot points rather than two and a stabilizing sleeve rather than a complicated latching mechanism, the instant device solves both problems. Additionally, the present invention provides simple, yet effective, safety and signalling mechanisms to further enhance the self-deploying vehicle jack. The invention also provides a safety mechanism which automatically raises any deployed jack should the ignition switch be turned on while the jacks are not in the non-deployed position.

An object of this invention is to provide a low-stress highly stable vehicle jack. Another object of this invention is to provide a vehicle jack with pressure and position signalling safety features to enhance the utility of self-deploying vehicle jacks. A still further object of this invention is to provide a simple yet sturdy vehicle stabilizing device that automatically deploys and signals the operator when in an activated position. Other and further objects of the invention will become obvious upon perusal of the specifications herein.

BRIEF SUMMARY OF THE INVENTION

The present invention comprises a mounting bracket which is attached to the underside of a vehicle. Normally four brackets and jacks are used, one mounted at each corner of the vehicle. The bracket is U-shaped and has a horizontal top and two opposed vertical legs. Each leg has an oppositely positioned hole so as to create a first pivot point across said holes. Also in the bracket are lower and offset second lower pivot points. The cylinder is attached to the first pivot point and a lift arm is attached to the second pivot point. The lift arm comprises an upper and lower leg, the legs being attached at a third pivot point. On the bottom of the lower lift leg is a lift plate. The upper part of the lower lift leg has a stabilizing slidable sleeve which fits around the cylinder. As the ram of the cylinder retracts, it contacts the lift plate. This lift plate in turn applies pressure to the lower lift arm, thence through the third pivot point to the upper lift arm. Since the lift arm is offset from the cylinder, a 1¼ inch displacement of the ram (after contacting of the lift plate) raises the entire apparatus into a horizontal position about the first pivot point. Since the stabilizing sliding sleeve is firmly attached to the lower lift arm and secured about the cylinder, the entire apparatus is stabilizied. A normally open magnetic switch operates a red light and buzzer inside the vehicle cab to signal when the jack is deployed. A 4-way electrically operated spool valve with a built-in check valve automatically determines a safe level of pressure in the apparatus. A safety circuit automatically raises any deployed jack should the ignition switch be turned on while any jack is deployed.

BRIEF DESCRIPTION OF THE DRAWINGS

FIG. 2 is a Side View of the apparatus shown in the partially open position.

FIG. 3 is a Front View of the apparatus in an open (deployed) position, partially cut away.

DETAILED DESCRIPTION OF THE PREFERRED EMBODIMENT

Figure 1:
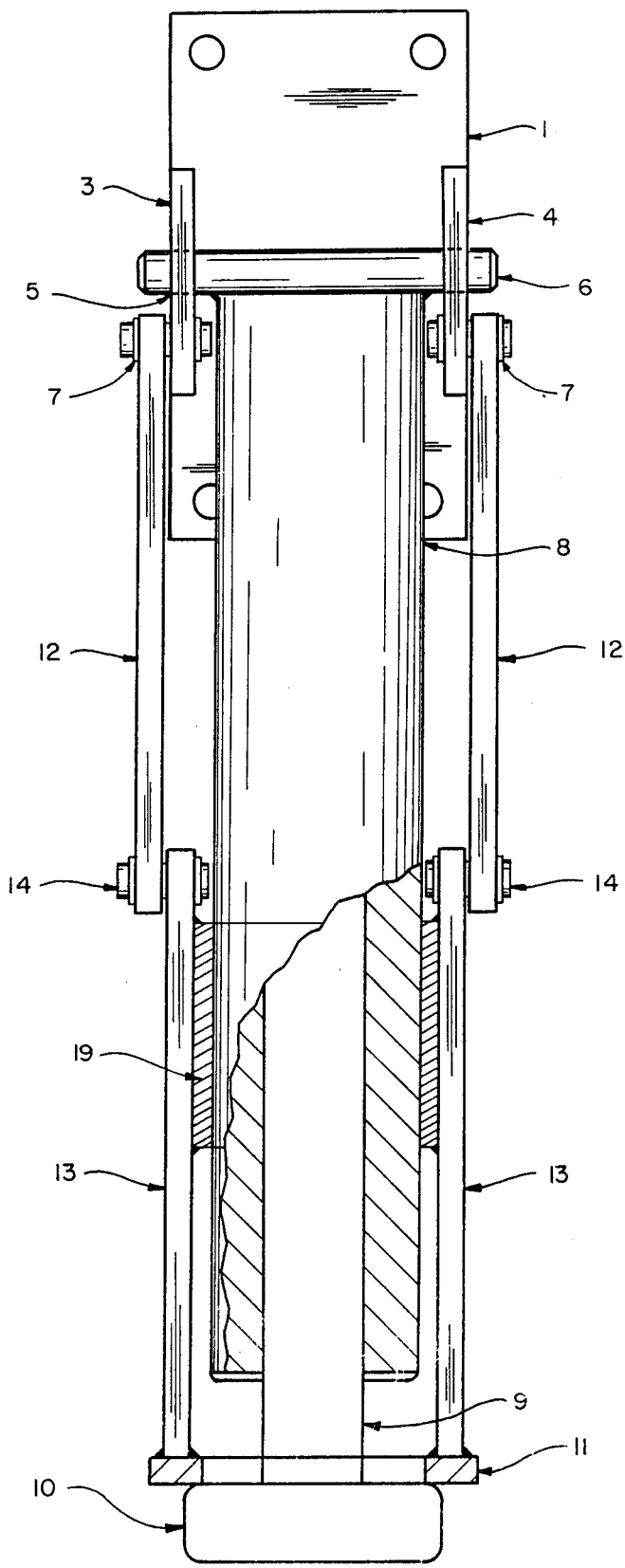
FIG. 1 is a Top View of the apparatus in the closed (nondeployed) position, partially cut away.

The basic structure of the self-deploying hydraulic jack comprises a bracket, a 2-way cylinder, a lift arm, an automatic pressure release valve and a magnetic signalling device.

The bracket (1) is of an inverted U-shape having a horizontal part (2) and opposed vertical legs (3 and 4). The vertical legs have opposed upper first pivot holes (5) through which a first pivot pin (6) is inserted. The preferred embodiment, to which all of the following sizes and dimensions relates, has a first pivot pin of ⅝ inches diameter. This shaft pivotally attaches the top of the cylinder to the bracket. The bracket also has a second, lower, offset pair of opposed holes (7), shown on FIG. 2. These second pivot holes (7) are set ⅝ inches below and 5/16 inches offset from the first pivot holes (5).

The cylinder comprises an outer cylinder (8) and a ram portion (9). The upper part of the outer cylinder is attached to the bracket at the first pivot point (5) by the first pivot pin (6). The pin may be welded to the top of the cylinder (as shown) or may be attached through angle brackets with holes then through or as in any suitable manner. The lower portion of the ram has a foot (10) at the bottom thereof. The foot has a circular crosssection and ultimately contracts the lift plate (11) upon retraction.

The lifting mechanism comprises an upper (12) and lower (13) lift arm. These upper and lower arms are connected about a third pivot point (14) as shown on FIG. 1. The upper lift arm is an essentially rectangular plate approximately 8 inches long, 1½" wide and ¼" thick. The upper portion of the upper lift arm has an upper hole (15) therein which allows the upper lift arm to be pivotally attached to the bracket about the lower, offset, second pivot point (7), FIG. 2. The lower portion of the upper lift arm has lower third pivot holes (16) approximately 6 and 15/16 inches from the upper lift plate hole (15).

The lower lift arm is approximately 11⅜ inches×1½×¼". Each upper and lower lift arm has an opposed lift arm positioned on the opposite side of the cylinder. The lower lift arm has a hole (17). FIG. 3, in the upper part thereof. A short pin (18) on each side of the cylinder pivotally attaches the upper and lower lift arms. Around the cylinder and fixedly attached to the upper part of each lower lift arm is a stabilizing sliding sleeve (19). This sliding sleeve surrounds the circular cylinder and slides up or down the cylinder depending upon the state of extension of the cylinder. The sleeve is welded to the lift arms in the preferred embodiment. At the lower end of the lower lift arm is a lift plate (11). This lift plate is also circular and has a hole in the center thereof to allow the ram to project therethrough.

The pressure in the cylinder is held by a 4-way electrically operated spool valve which has a built in check valve. The check valve is rated to release pressure in the cylinder should it rise above a desired level. The hydraulic pump used with this embodiment also has a built in check valve and a by-pass valve which opens at about 2000 psi.

Figure 4:
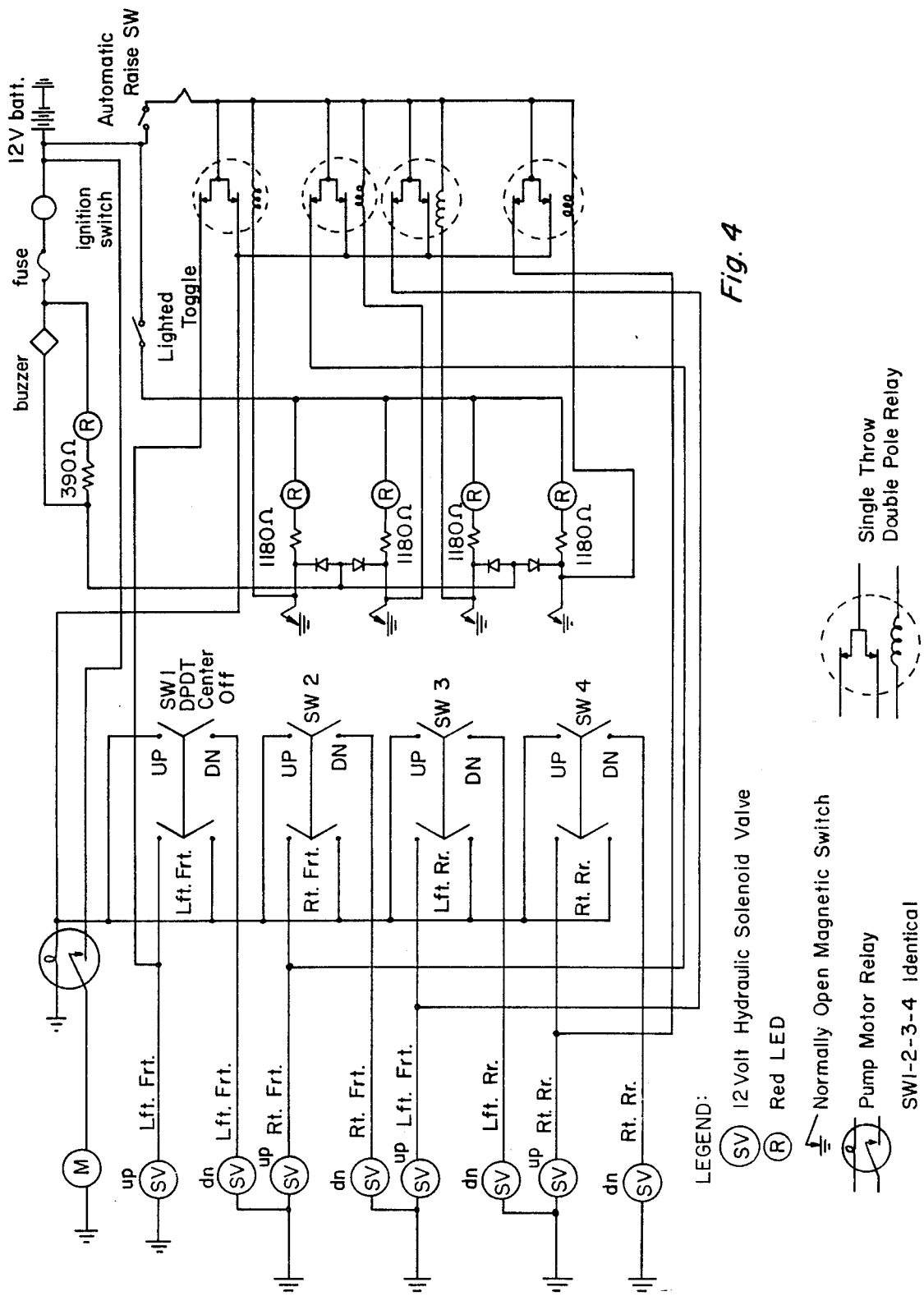
FIG. 4 is a schematic of the wiring circuitry of the invention.

An added feature on the preferred embodiment to keep the vehicle from being moved when the cylinder is in its deployed (down) position is a control panel located on the dash within the cab of the vehicle. This control panel comprises raise and lower switches as well as a red warning light, as shown in the schematic, FIG. 4. In addition to this warning light (which comes on whenever the cylinder is lowered more than about 2 inches from the horizontal) the present device has a red-blinking danger light and a loud buzzer. These latter two warnings are activated whenever the cylinder is in the "deployed" (i.e. more than about 2 inches from horizontal) position and when the vehicle ignition is activated. The buzzer and danger light for each cylinder are activated by a normally open magnetic switch. The switch comprises a magnet (20) mounted on the cylinder and a contact (21) mounted on the bracket (1). See FIG. 2. When the device is horizontal, the cylinder and bracket are adjacent each other and the danger switch is in the normally open mode. When the hydraulic cylinder is activated and the cylinder and connected apparatus moves to the vertical or deployed position, the circuit closes causing the red danger light to become activated. Should the ignition switch also become activated, the red danger light and buzzer will signal the operator of the vehicle. Although a magnetic switch has been found to the preferred embodiment of this invention, a mercury switch or other suitable switching device could also be employed. In practice, it is necessary to use a non-magnetic attached device for the magnet on the cylinder.

A still further safety feature includes a safety circuit (shown in Schematic, FIG. 4) which automatically raises any deployed jack should the ignition switch be turned on while such deployed jack is down. This circuit would override the normal operating switches and raise any deployed jack until such jack is raised to the safe horizontal position. At the point where the jack is then raised to the safe position, the normal operation of the magnetic or mercury switches shut off the jack pressure pump.

In actual operation gravity deployes the device to the vertical position and the action of the retracting ram on the left plate, through the offset pivot points raises the device to the horizontal. Due to the unique arrangement of the cylinder and the upper and lower lift legs, the device may be raised by a low-stress power stroke, due to the presence of the third pivot point and the overall design. In actual practice, the dimensions given herein allow the entire device to be raised by only 1¼" of compressive stroke of the ram. Obviously, the dimensions herein could be changed so as to create more or less lift per inch of compression stroke. However, the spacing and measurements herewith provide the most efficient and preferred embodiment of the present invention. The precise measurements given here are meant as illustration only and not meant to limit the application of the present submission. The pins, lift arms, lift plate and sliding sleeve are preferably made of steel. The magnet on the cylinder (21) and the magnetic contact on the bracket are secured by means of aluminum bands or are otherwise insulated from the steel. The stabilizing sliding sleeve (19) is welded to the lower lift arm preferably although any suitable fixed attachment method is acceptable.

In practice it has been bound that Model PMC5412 21.2×12 cylinder, manufactured by Prince Hydraulics (4600 South Lewis, Sioux City, Iowa) is quite suitable for this application, although other cylinders are acceptable and interchangeable herein.

Having thus described my invention,

I claim:

1. A self-deploying jack support system for a vehicle, comprising:
  (1) a plurality of inverted U-shaped brackets each having opposed upper first pivot holes and opposed, offset lower second pivot holes;
  (2) a corresponding two-way cylinder for each of said brackets, each cylinder having an upper outer cylinder portion pivotally attached about said first corresponding pivot holes and a lower ram portion having a foot at the lower end thereof;
  (3) for each bracket and corresponding cylinder a flat upper lift arm having its upper portion pivotally attached about said second corresponding pivot holes and having opposed third pivot holes at its lower end;
  (4) for each bracket and corresponding cylinder a flat lower lift arm having its upper end pivotally attached about said third corresponding pivot holes, said lower lift arm further comprising a stabilizing sleeve attached to the upper end of said lower lift arm and having a lift plate at the lower end thereof, said bracket, corresponding cylinder and lift arms comprising a jack support;
  (5) an electrically operated spool valve for automatically releasing the pressure in any of said two-way cylinders, if said pressure rises above a safe level;
  (6) for each jack support an individual means for signalling the operator of said jack support system when any individual jack support is in the deployed position, and also for automatically shutting off the pump mechanism once said jack support reaches the safe, horizontal position with the ignition in the "on" position;
  (7) for each jack support an individual safety means which automatically visually and audibly warns the operator of said jack support system when said jack support is deployed with the ignition "on" and which automatically raises said jack support whenever the ignition switch to the vehicle is turned "on" and the jack support is in the deployed position;
  whereby, when a plurality of jack supports are attached to a vehicle the vehicle may be supported by said jack supports and, further, warning signals visually alert the operator if each jack is deployed and visually and audibly alert the operator and raise the jack support if any jack support is deployed with the ignition in the "on" position.

2. A self-deploying jack support system as in claim 1, wherein said signalling and automatic shut-off means comprises a normally open mercury switch mounted on said upper lift arm whereby when said upper lift arm pivots toward the vertical position a warning light is activated.

3. A self-deploying jack support system as in claim 1, wherein said signalling and automatic shut-off means comprises a normally open magnetic switch one part of which is attached to said bracket and one part of which is attached to said cylinder whereby when said cylinder pivots toward the vertical position a warning light is activated.

4. A self-deploying jack support system as in claim 1, wherein said stabilizing sliding sleeve comprises a cylindrical member which completely surrounds said cylinder and is attached to said flat lower lift arm whereby when said ram is extended, said stabilizing sleeve constrains the relative movement of said flat upper and lower lift arms and stabilizes same.

5. A self-deploying jack support system as in claim 1, wherein four jack supports are attached to a vehicle, one jack support near each wheel.

6. A self-deploying jack support system as in claim 1, further comprising an automatic raise switch whereby an operator may manually override the automatic raise circuit and run the engine while keeping the jack supports deployed.

* * * * *